(No Model.) 2 Sheets—Sheet 1.
S. MOORE.
MACHINE FOR MAKING TWIST DRILLS.
No. 331,904. Patented Dec. 8, 1885.
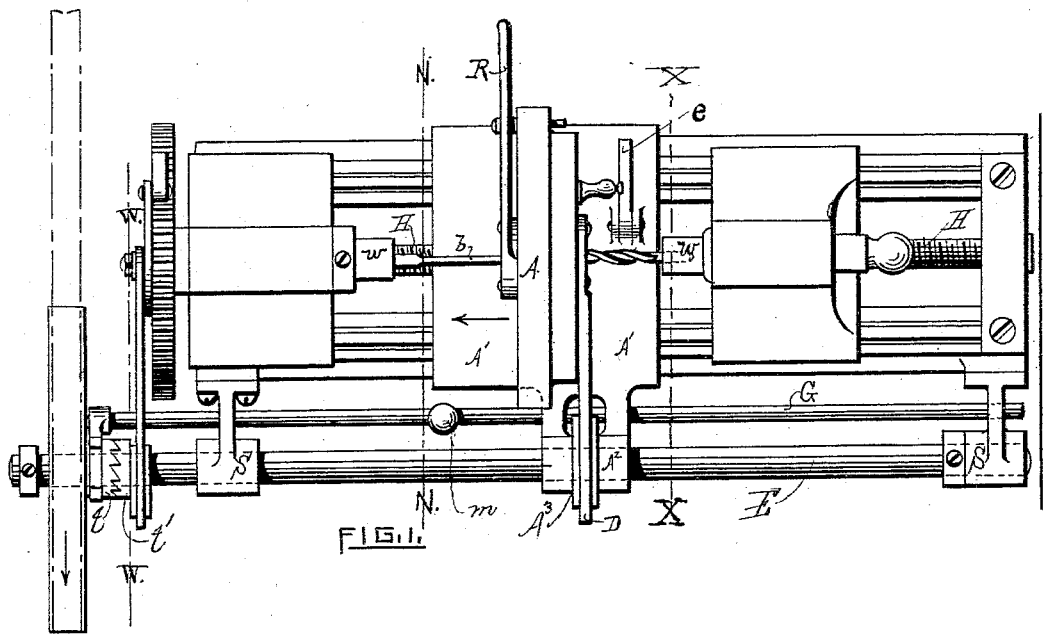
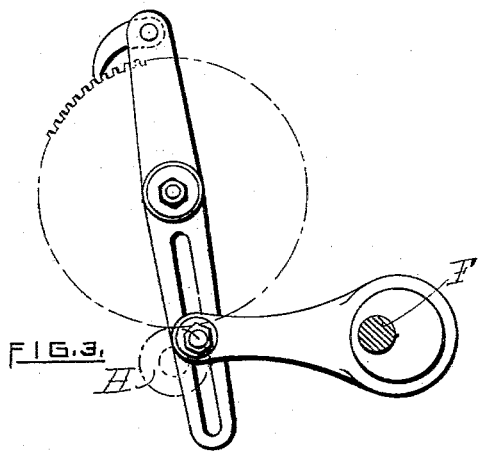
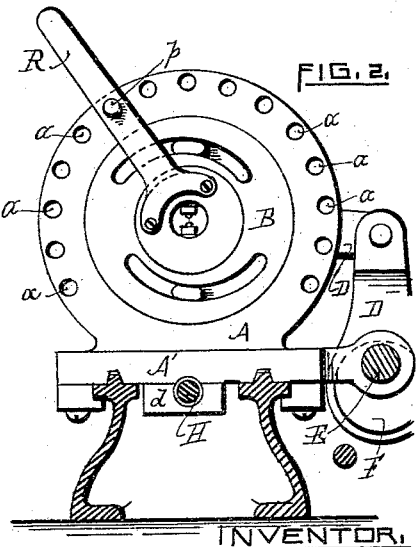
WITNESSES.
Sullivan Fenner
Geo. H. Remington
INVENTOR.
Samuel Moore
by Henry Marsh Jr.
his attorney

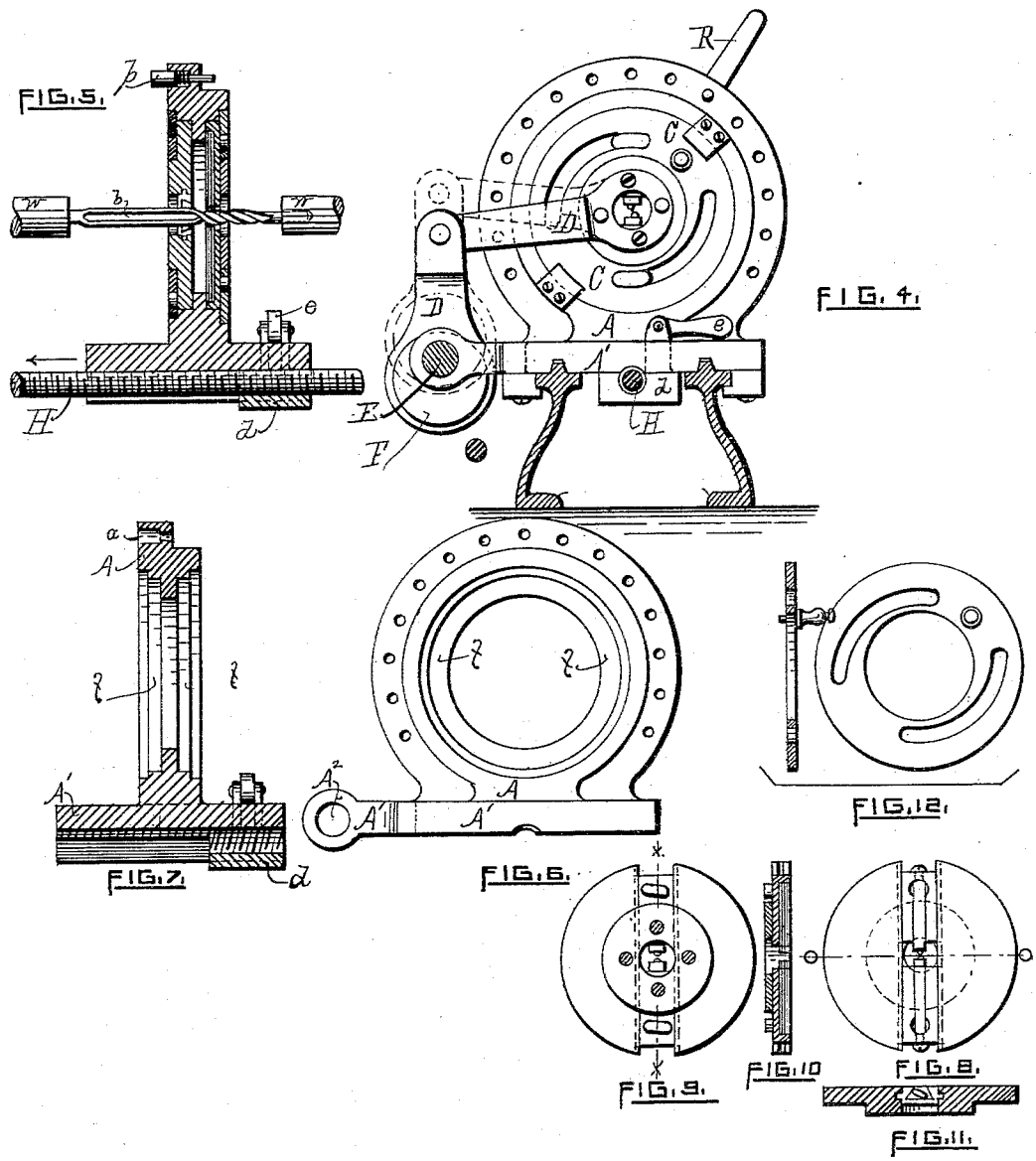

UNITED STATES PATENT OFFICE.

SAMUEL MOORE, OF PROVIDENCE, RHODE ISLAND.

MACHINE FOR MAKING TWIST-DRILLS.

SPECIFICATION forming part of Letters Patent No. 331,904, dated December 8, 1885.

Application filed March 14, 1885. Serial No. 158,784. (No model.)

*To all whom it may concern:*

Be it known that I, SAMUEL MOORE, a citizen of the United States, residing in the city and county of Providence, in the State of Rhode Island, have invented a new and useful Twist-Drill Machine, of which the following is a specification.

My invention relates to a twist-drill machine in which there are two chucks placed in a chuck-holder, with their inner faces parallel to each other and a short distance apart, and their axes lying in the same horizontal line. One of said chucks has attached to it a radial arm or lever extending beyond it and a little beyond the rim of the chuck-holder. The other of said chucks is connected by a crank-arm and cam-eccentric with an auxiliary shaft bracketed to and parallel with the side of the lathe-bed. The chuck-holder has an overhanging base, which is gibbed to the lathe-bed, and, projecting a considerable distance to one side of the bed, is enlarged to form a sliding guide-bearing for the auxiliary shaft, and open-slotted at its extreme outer edge to receive the cam-eccentric referred to above. The said chuck-holder sits upon the lathe-bed between the two lathe-mandrels, which are centered with the chucks. It is moved upon the slides of the lathe by a feed-screw, and has in its rim a series of holes concentric with the chucks.

The radial arm referred to above is, in adjusting its connected chuck, held in the requisite position by a pin engaging it and one or the other of said holes. There are means provided for disconnecting the feed mechanism, and other means for disconnecting the auxiliary shaft.

Structurally my invention may be divided into the following three systems of mechanism: The first system comprises the lathe frame and bed, the feed-screw, the chuck-holder, and the lathe-mandrels. The second system comprises the holder, one chuck, and its connected crank-arm and auxiliary shaft. The third system comprises the holder, the second chuck, and its radial arm.

In the first system the chuck-holder is provided with interior flanges on either face to form seats for the chucks, which are fitted therein so that they may turn freely. I drill a series of holes in the rim of the chuck-holder, about midway between its outer edge and the outer edge of the chuck. The remaining parts of this system are those common to the more improved modern power-lathe.

In the second system the chuck, which has jaws which can be made to approach and recede from each other and operate simultaneously or be independently adjusted, is seated in the holder so that the central vertical line of the jaws will be perpendicular to the axial line of the holder and the engaged drill-blank. Attached to this chuck is a crank-arm connected with the auxiliary shaft by a cam-eccentric. As the chuck-holder is fed along the lathe-bed the chuck is rocked by the crank-arm and auxiliary shaft.

In the third system the chuck is seated in the holder, and is provided with a radial arm or lever, by which it can be turned in its seat so as to bring its jaws to any desired angle relatively to the line of the jaws of its opposite parallel chuck, but always at a right angle to the axial line of the engaged drill-blank. The radial arm is secured at the desired position by a pin engaging it and the proper one of the series of holes in the rim of the holder.

The several parts being assembled, the drill-blank is held between the mandrels, and, passing through the center of the chucks, its grooves are engaged by the jaws of the two chucks. The adjustable chuck is then turned in the holder until the desired amount of twist is imparted to that portion of the blank lying in the space between the two chucks, when the adjustable chuck is secured in that position by the pin engaging its radial arm and the proper one of the series of holes. The power being then applied, the holder is fed along the lathe-bed, moving the chucks along the drill-blank, the auxiliary shaft in the meantime actuating the cam-eccentric to oscillate the crank-arm and rock the chuck. We thus have moving along the drill-blank a die formed by the two chucks, the jaws of which lie in parallel vertical planes, with their central lines at an angle relatively to one another, and the twist being put into that part of the blank lying between the chucks while they travel along it.

If the die consisted simply of two chucks held stationary in the holder, but with the same relative arrangement of their jaws, and the attempt should be made to force them along the drill-blank, held between the mandrels, as described, it would result in a roughing of the groove-faces of the blank and a crimping or doubling up of the blank in front of the die, owing to the friction.

In my invention, by the use of one stationary and one oscillating chuck placed a short distance apart in the holder, as shown and described, the friction is reduced to a minimum, and the twist is put into the blank between the two chucks, the jaws of the stationary chuck steadying the blank and sliding freely in the grooves of the blank in advance of the twist, which is put into the blank by the jaws of the oscillating chuck, without indenting or roughing or otherwise marring the finish of the groove-faces. The full strength of the metal is fully retained and utilized—an important consideration in the manufacture of twist-drills, not hitherto accomplished by any rolling process, whether including the use of a series of graduated rolls or not, and certainly not by any process which involves the cutting away of the outer skin and most essential part of the blank, as in the milling process.

The blank which I have found to give the best results when used in connection with my invention is the double blank shown and described and claimed by me in an application now pending for Letters Patent for improvements in manufacture of twist-drills, as in the use of this blank two drills are twisted at each forward movement of the chuck-holder. The single blank can nevertheless be used to advantage, requiring more manipulation, however, to accomplish the results attained by the use of the double blank.

In the drawings, Figure 1 is a top plan view. Fig. 2 is a front elevation of the holder, the lathe-frame and auxiliary shaft being shown in cross-section on line N N of Fig. 1. Fig. 3 is an elevation of the feed-ratchet and pawl and the lever-connections with the auxiliary shaft. Fig. 4 is an elevation of the rear face of the holder, with the frame, feed-screw, and auxiliary shaft shown in cross-section on line X X of Fig. 1. Fig. 5 is a sectional edge view of the holder and chucks, drill-blank, and mandrel. Fig. 6 is a front elevation of the holder with the chucks removed. Fig. 7 is an edge view of the same in cross-section. Figs. 8 and 9 are respectively a rear and front view of one of the chucks. Fig. 10 is a vertical central section of same in edge view on line $x\,x$ of Fig. 9, and Fig. 11 is a cross-section of same on line $o\,o$ of Fig. 8. Fig. 12 shows, in front elevation and sectional edge view, one form of a face-plate common to chucks in which the movable jaws are operated by projecting lugs on their front faces engaging and moving in cam-shaped slots in the face-plate.

A represents the chuck-holder, provided with an overhanging base, $A'$, which has an enlarged portion, $A^2$, forming a guide-bearing for the auxiliary shaft. The base $A'$ is open-slotted at $A^3$ to receive the cam-eccentric F. The holder A is provided with a series of holes, $a\,a\,a$, in its rim, and with interior flanges, $f\,f$, on either face.

B represents the adjustable chuck, which is seated in the flanges of one face of the holder A, and is provided with a radial arm, R, by means of which it is turned in its seat to bring the central longitudinal lines of the chuck-jaws at any desired angle to the central vertical line of the holder. When the chuck is adjusted at the desired point, it is held there by the pin $p$ engaging the said arm and the proper one of the series of holes $a\,a$.

C is the rotating chuck, which is seated in the face of the holder A, with its inner face parallel with and a short distance from the inner face of the chuck B. The crank-arm D D, bent at a right angle, is attached to the face of the chuck C, and extends to and engages the cam-eccentric F on the auxiliary shaft E. Each revolution of the shaft imparts a vertical oscillating movement to the crank-arm D D and rocks the chuck C in its seat in the holder A, as indicated by the dotted lines in Fig. 4. The shaft E extends parallel with the lathe-bed, and is journaled in the bearings S S, bracketed to the sides of the same. Journaled in the said bearings at a point between the bed and the shaft E, and a little below the latter, is a shaft, G, provided with an adjustable stop, $m$, by means of which the travel of the holder is stopped and the clutch $t$ thrown out of mesh with the ratchet $t'$ on the auxiliary shaft E to stop the rocking of the chuck C.

The holder-base $A'$ is engaged with and disengaged from the feed-screw H by raising or lowering the half-nut $d$ by means of the handle $e$.

$w\,w$ are the mandrels, and $b$ the drill-blank.

I make no claim to the form of chuck herein shown; neither do I limit my invention to the use of such chuck. Any chucks can be used to advantage which admit of adjustment in their seats so as to bring the central lines of their jaws at any desired angle relatively one to the other in parallel vertical planes, substantially as shown and described, one of said chucks being held stationary, while the other rocks in its seat while imparting the twist to that part of the blank situate between the parallel inner faces of the chucks.

I claim as my invention and desire to secure by Letters Patent—

1. In a drill-twisting machine, the combination of a chuck-holder, A, provided on either face with interior flanges, $f\,f$, with the chucks B and C, seated in said flanges, with their inner faces parallel and a short distance apart, and their axes lying in the same horizontal right line, said chucks being capable of adjustment in their seats relatively to each other, as shown, and for the purposes specified.

2. In a drill-twisting machine, the combination of a chuck-holder, A, provided with a series of holes, $a\,a\,a$, in its rim, as shown, with a chuck, B, radial arm R, and pin $p$, all arranged and operating substantially as shown, and for the purpose specified.

3. In a drill-twisting machine, the combination of a chuck-holder, A, with a chuck, C, crank-arm D D, cam-eccentric F, and auxiliary shaft E, all arranged as shown, and adapted to rock the chuck in its seat in the holder, as described.

4. In a twist-drill machine, the combination of the following elements, namely: a lathe-frame and its feed mechanism and mandrels, a chuck-holder gibbed to and adapted to move along the lathe-bed, a chuck, B, seated in the holder and capable of adjustment therein so as to bring the central longitudinal line of its jaws at any desired angle with the central vertical line of the holder, and a chuck, C, also seated in the holder, with its inner face parallel with the inner face of the chuck B, and the central line of its jaws parallel with the central vertical line of the holder and at a right angle to the axial line of the chuck, a crank-arm, D D, cam-eccentric F, and auxiliary shaft E, all arranged as shown and described, and combined with suitable means of conveying motive power thereto.

5. In a twist-drill machine, a die consisting of a holder having two chucks seated in its parallel faces, said chucks being capable of adjustment in their seats, whereby their jaws are caused to engage the groove-faces of the drill-blank at different angles to its axial line, and one of said chucks being after adjustment held stationary in the holder, while the other is oscillated as the die is moved along the blank, thereby imparting the twist to the same, substantially as shown and described.

In testimony whereof I have hereunto set my hand, in presence of two witnesses, this 11th day of March, 1885.

SAMUEL MOORE.

Witnesses:
 HENRY MARSH, Jr.,
 SULLIVAN FENNER.